(12) United States Patent
Poncelet

(10) Patent No.: US 8,287,779 B2
(45) Date of Patent: Oct. 16, 2012

(54) ALUMINOSILICATE POLYMER AS FIRE RETARDANT

(75) Inventor: Olivier Poncelet, Grenoble (FR)

(73) Assignee: Commissariat a l'Energie Atomique et aux Energies Alternative, Paris (FR)

( * ) Notice: Subject to any disclaimer, the term of this patent is extended or adjusted under 35 U.S.C. 154(b) by 95 days.

(21) Appl. No.: 12/918,490

(22) PCT Filed: Feb. 9, 2009

(86) PCT No.: PCT/FR2009/000142
§ 371 (c)(1),
(2), (4) Date: Sep. 28, 2010

(87) PCT Pub. No.: WO2009/112712
PCT Pub. Date: Sep. 17, 2009

(65) Prior Publication Data
US 2011/0129400 A1    Jun. 2, 2011

(30) Foreign Application Priority Data
Feb. 21, 2008    (FR) ..................... 08 00937

(51) Int. Cl.
*C09K 21/02*    (2006.01)
*C08K 3/34*    (2006.01)
*C01B 33/26*    (2006.01)

(52) U.S. Cl. .............. 252/601; 106/15.05; 106/18.11; 106/483; 252/609; 264/239; 264/331.11; 423/328.1; 423/328.2; 423/718

(58) Field of Classification Search ............... 106/15.05, 106/18.11, 483; 252/601, 609; 423/328.1, 423/328.2, 718; 264/239, 331.11
See application file for complete search history.

(56) References Cited

U.S. PATENT DOCUMENTS

| | | | | | |
|---|---|---|---|---|---|
| 5,972,831 | A | * | 10/1999 | Poncelet et al. | ............... 502/304 |
| 6,254,845 | B1 | * | 7/2001 | Ohashi et al. | ............... 423/328.1 |
| 6,468,492 | B2 | * | 10/2002 | Poncelet | ............... 423/328.1 |
| 6,680,066 | B2 | * | 1/2004 | Poncelet et al. | ............... 424/421 |
| 6,699,451 | B2 | * | 3/2004 | Rigola et al. | ............... 423/328.1 |
| 7,507,392 | B2 | * | 3/2009 | Poncelet et al. | ............... 423/700 |
| 7,560,092 | B2 | * | 7/2009 | Poncelet et al. | ............... 423/711 |
| 2005/0238559 | A1 | * | 10/2005 | Poncelet et al. | ............... 423/328.1 |
| 2006/0045833 | A1 | * | 3/2006 | Poncelet et al. | ............... 423/328.1 |
| 2007/0106006 | A1 | | 5/2007 | Cooper et al. | |

FOREIGN PATENT DOCUMENTS

| | | |
|---|---|---|
| FR | 2 842 514 | 1/2004 |
| JP | 58-220820 | 12/1983 |
| JP | 2001-064010 | 3/2001 |
| JP | 2002-293600 | 10/2002 |
| JP | 2007-204565 | 8/2007 |

OTHER PUBLICATIONS

International Search Report and Written Opinion for International Application No. PCT/FR2009/000142, mailed Sep. 25, 2009.

* cited by examiner

*Primary Examiner* — Anthony J Green
(74) *Attorney, Agent, or Firm* — Alston & Bird LLP

(57) ABSTRACT

The invention relates to a fire retardant product. The invention comprises using at least one aluminosilicated polymer of the imogolite type or allophane type as a fire retardant. The invention can particularly be used in the field of fire retardant products.

1 Claim, 3 Drawing Sheets

ALUMINOSILICATE POLYMER AS FIRE RETARDANT

FIELD OF THE INVENTION

The invention relates to the use of at least one aluminosilicate polymer of the imogolite or allophane type as a fire retardant. It also relates to a fire-retarded composition and to a polymeric material comprising at least one aluminosilicate polymer of the imogolite or allophane type.

BACKGROUND OF THE INVENTION

Many polymeric materials, i.e. materials consisting of polymers, must have fire-resistant properties for their end use.

In a fire situation, the aim is mainly to prevent the fire from spreading because of the presence of fabrics, tarpaulins and wall coverings based on polymeric materials and/or to limit physical deterioration of the polymer when it is used, for example in a protective garment, or even ultimately to trap the toxic volatiles resulting from the decomposition of the polymeric materials.

Hitherto, organic or inorganic additives were added when producing compositions of polymeric materials, these being called "compounds" when the polymeric material is extruded or "formulations" when the polymeric material is deposited by coating.

The organic additives used as fire retardants are often, at the present time, molecules containing bromine or fluorine. Their use is therefore limited to certain usages because of the toxicity of the combustion by-products. One combustion by-product that is particularly hazardous is hydrofluoric acid, HF.

The inorganic additives used hitherto are hydroxides or oxyhydroxides of transition metals, or of metals of groups III and IV of the Periodic Table of the Elements, or else carbonates of these transition metals or metals of groups III and IV. However, inorganic additives of the latter type decompose, releasing $CO_2$.

The use of inorganic additives of the hydroxide type is based principally on the oxolation mechanism: $2M-OH \rightarrow MO+H_2O$.

Under the action of heat, the hydroxyl groups on the surface of the inorganic particles condense, releasing water, and this water, on vaporizing, will "cool" the system, thereby slowing down or even stopping flame spread.

There is therefore a direct relationship between the number of available hydroxyl groups and the potential of the inorganic particle as fire-resistant filler. Likewise, it is preferable to use mineral fillers of nanoscale size, these developing very high specific surface areas and thus increasing the number of available hydroxyl groups on the surface.

The formulator must therefore "fill" its polymeric material in such a way that the composite obtained has the desired usage properties, in particular in terms of surface appearance, mechanical strength, etc. and also in terms of fire resistance corresponding to the standards of the field of use.

A compromise must be found in respect of the inorganic filler/polymer ratio.

Thus, for example, in the case of polyvinyl chloride (PVC) materials, the flame retardants are antimony-hydroxides or tin hydroxides.

The formulator must also take into account chemical incompatibilities that preclude mixing just any filler with just any polymer. Moreover, the fact that in crystalline nanofillers the energy of the surface hydroxyl groups is not at all homogeneous, for certain surface hydroxyl groups the oxolation will take place only at very high temperature, thereby limiting the advantage thereof for many usages, the damage having already taken place.

The formulator must also take into account future recycling of the fire retardant/polymer composite and eliminate environmentally toxic substances. Now, the antimony and tin compounds currently used are toxic substances.

There is therefore a need for a fire retardant that does not produce toxic by-products, has a very large number of surface hydroxyl groups that can undergo oxolation at low temperature, is pure and can be modified so as to be compatible with the largest possible number of polymeric matrices.

SUMMARY OF THE INVENTION

The invention satisfies this need by providing the use of at least one aluminosilicate polymer of the imogolite or allophane type, as fire retardant.

The invention also provides a fire-retarded composition characterized in that it comprises at least one aluminosilicate polymer of the imogolite or allophane type.

The invention also provides a polymeric material, characterized in that it comprises at least one aluminosilicate polymer of the imogolite or allophane type.

Finally, the invention provides a method of preparing a fire retardant article comprising molding an article comprising of at least one aluminosilicate polymer of imogolite or allophane.

Aluminosilicate polymers in various forms are known.

For example, aluminosilicate polymers in fibrous form are known, such as imogolite. Imogolite is a tubular filamentary aluminosilicate that exists in the natural state in volcanic ash and in certain soils. Natural imogolite is impure and is mixed with other aluminosilicates, such as allophanes and/or boehmite. Natural imogolite cannot be used in this impure form, in particular for high-performance polymer formulation.

There are various methods of synthesizing imogolite to relatively high degrees of purity. For example, the Farmer U.S. Pat. Nos. 4,152,404 and 4,252,779 describe a method of preparing an inorganic material similar to natural imogolite.

The imogolite obtained is stripped of charges, such as salts, by dialysis. However, this technique does not allow elimination of allophanes that do not carry charges.

Moreover, WADA et al. in Journal of Soil Science 30, 347, (1979) describe a pure imogolite having an Al/Si molar ratio close to 2. It is pointed out therein that the terms "very high degree of purity" or "high degree of purity" denote an aqueous solution containing at least 80% and preferably at least 90% imogolite by weight.

European patent 0 741 668 describes a lengthy and precise process for obtaining imogolite with a very high degree of purity. In particular, it is absolutely necessary, during the step of digesting or growing the filaments, to maintain the pH and the Al+Si concentration in very precise ranges of values. In the case of uncontrolled synthesis, the formation of allophane or boehmite or silica gels is observed.

Boehmite has a nonfibrous structure with an Al:Si molar ratio greater than 4.

Thus, when the synthesis has not been controlled sufficiently, the imogolite obtained is not sufficiently pure for applications as a filler in polymeric materials.

French patent application 2 817 488 describes a process for obtaining an aluminosilicate polymer of the high-purity imogolite type that can be used in the formulation of polymeric materials, by purifying an aqueous dispersion of a mixture of colloidal aluminosilicate particles obtained using the process described in European patent 0 741 668. Thus, the mixture of colloidal particles is purified by ultrafiltration so as to obtain, in the retentate, a fibrous polymer aluminosilicate of the imogolite type having an Al/Si molar ratio of between 1.8 and 2.5. Preferably, the ultrafiltration is cross-flow ultrafiltration and it is also preferable to use a polyethersulfone-based membrane. Preferably, the laminar flow in the retentate is approximately equal to 1 l/min for a membrane area of 1 m². The mixture of particles may also be prefiltered before carrying out the ultrafiltration step.

French patent application 2 802 912 describes a method of preparing an aluminosilicate polymer of the high-purity imogolite type.

This method comprises the following steps:
a) a mixed silicon aluminum alkoxide, or a precursor of a mixed aluminum silicon compound, is treated with an aqueous alkali, at a pH between 4.5 and 6.5 inclusive, by maintaining the molar aluminum concentration between $5 \times 10^{-4}$ and $10^{-2}$ M inclusive and the Al/Si molar ratio between 1 and 3 inclusive, in the presence of silanol groups;
b) a maturation step is carried out at room temperature, preferably for a time of between 5 and 15 days inclusive, most preferably for a time of between 8 and 10 days inclusive;
c) the mixture obtained in step a) is heated at a temperature below 100° C., preferably at a temperature of 96-98° C., for 24 hours; and
d) the residual ions are removed from the mixture obtained in step c), for example by ultrafiltration.

The details of this method are given in French patent application 2 802 912.

Thus, in the foregoing text and in what follows, the terms "aluminosilicate polymer(s) of the imogolite type" denotes aluminosilicate polymers obtained by the process described in French patent application 2 817 488 and the method described in French patent application 2 802 912, and are those used in the invention.

Aluminosilicate polymers in the form of spherical particles, such as allophanes, are also known.

As mentioned above, allophanes also exist in the natural state in combination with natural imogolite.

However, in the natural state this is an impure product that cannot be used as filler for a polymeric material.

U.S. Pat. No. 6,254,845 describes a method of preparing hollow spheres of aluminosilicate polymers of the allophane type. However, the aluminosilicate polymer obtained contains, because of the method of manufacture used, a high proportion of the salt used to form it.

French patent application 2 842 514 describes a method of preparing an aluminosilicate polymer of the imogolite or allophane type, which is very pure and can be used for formulating many polymeric materials.

This method consists in:
a) treating a mixed aluminum silicon alkoxyde having only hydrolyzable functional groups (i.e. having only substituents that can be eliminated by hydrolysis during the method and in particular during the treatment with an aqueous alkali), or a mixed aluminum silicon precursor obtained by hydrolysis of a mixture of aluminum compounds and silica compounds having only hydrolyzable functional groups, with an aqueous alkali in the presence of silanol groups, the aluminum concentration being maintained at below 0.3 mol/l, the Al/Si molar ratio being maintained between 1 and 3.6 and the alkali/Al molar ratio being maintained between 2.3 and 3;
b) stirring the mixture obtained at room temperature in the presence of silanol groups for a time sufficient to form the aluminosilicate polymer; and, finally
c) removing the by-products formed during the preceding steps from the reaction mixture. The removal of the by-products may be carried out by various methods known per se, such as washing or diafiltration or ultrafiltration, preferably cross-flow ultrafiltration.

The details of this method are given in French patent application 2 842 514.

The aluminosilicate polymer of the imogolite or allophane type obtained is characterized by a Raman spectrum comprising, in the 200-600 cm$^{-1}$ spectral range, a broad band at 250±5 cm$^{-1}$, an intense broad band at 359±4 cm$^{-1}$, a shoulder at 407±7 cm$^{-1}$ and a band at 501±2 cm$^{-1}$, the Raman spectrum being produced on the material obtained just before the step of removing the by-products formed during steps a) and b) from the reaction mixture.

French patent application 2 842 514 describes this method and the conditions for obtaining the Raman spectrum.

DETAILED DESCRIPTION OF THE INVENTION

Thus, the term "aluminosilicate polymer(s) of the imogolite or allophane type" denotes, in the foregoing text and in what follows, aluminosilicate polymers obtained by the method described in French patent application 2 802 912 or by the process described in French patent application 2 817 488 or by the method described in French patent application 2 842 514.

The aluminosilicate polymers of the imogolite type that are used in the invention are hollow nanotubes 2 nm in diameter and several microns in length. As already mentioned, they are obtained by controlled cohydrolysis of aluminum salts and silicon alkoxides. This hydrolysis is followed by a heat treatment that enables the filaments to grow. These filaments are then washed and concentrated by ultrafiltration. The structure of these aluminosilicate polymers of the imogolite type is very particular: the outside of the tube is covered with Al—OH, whereas the inside of the tube is covered with Si—OH. Thus, water remains indefinitely trapped inside the tube.

The aluminosilicate polymers of the allophane type that are used in the invention are hollow nanospheres 5 nm in diameter, also obtained by controlled cohydrolysis of aluminum and silicon salts. However, in this case the hydrolysis is not followed by a heat treatment, the main parameter for obtaining either imogolite or allophane being the aluminum salt concentration. This aluminosilicate polymer of the allophane type, like the aluminosilicate polymer of the imogolite type, is also covered on the outside with Al—OH and on the inside with Si—OH. Likewise, in this aluminosilicate polymer of the allophane type, the core of the particle is filled with water.

The aluminosilicate polymers of the imogolite type and those of the allophane type are both amorphous polymers. They are stable up to 300° C., after which they suddenly decompose to $H_2O$, $Al_2O_3$ and $SiO_2$.

These aluminosilicate polymers are particularly suitable as flame retardants since, both on the inside and on the outside, they are covered with reactive hydroxyl groups, i.e. groups that can undergo oxolation at low temperature. In addition, the water trapped within their structure contributes to the cooling as it undergoes evaporation.

Again, their nanoscale size provides a very high specific surface area and therefore a very large number of available hydroxyl groups. Their surface may be readily modified by a sol-gel reaction so as to control the chemical affinity with many polymer matrices. Again, the Al—OH type surfaces present on the external surface of these aluminosilicate polymers are capable of trapping any products resulting from the combustion of the polymer matrix, such as HCl or HCN, thus protecting users.

Figure 1:
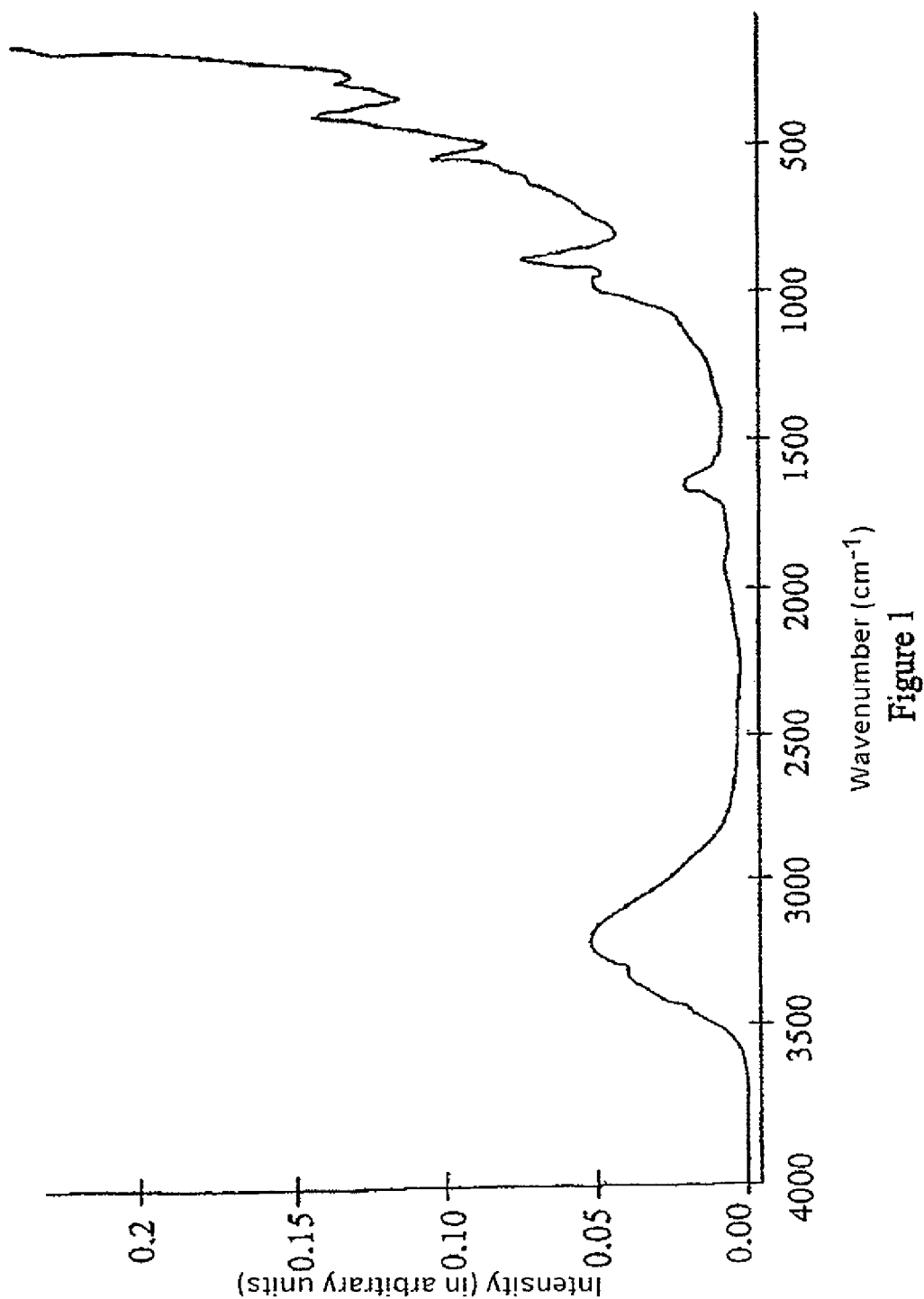
FIGS. 1 to 3 appended herewith show the Raman spectra of three aluminosilicate polymers used in the invention. It may be seen in these figures that the Raman spectrum of the aluminosilicate polymers used in the invention is well characterized, as described above.
Figure 2:
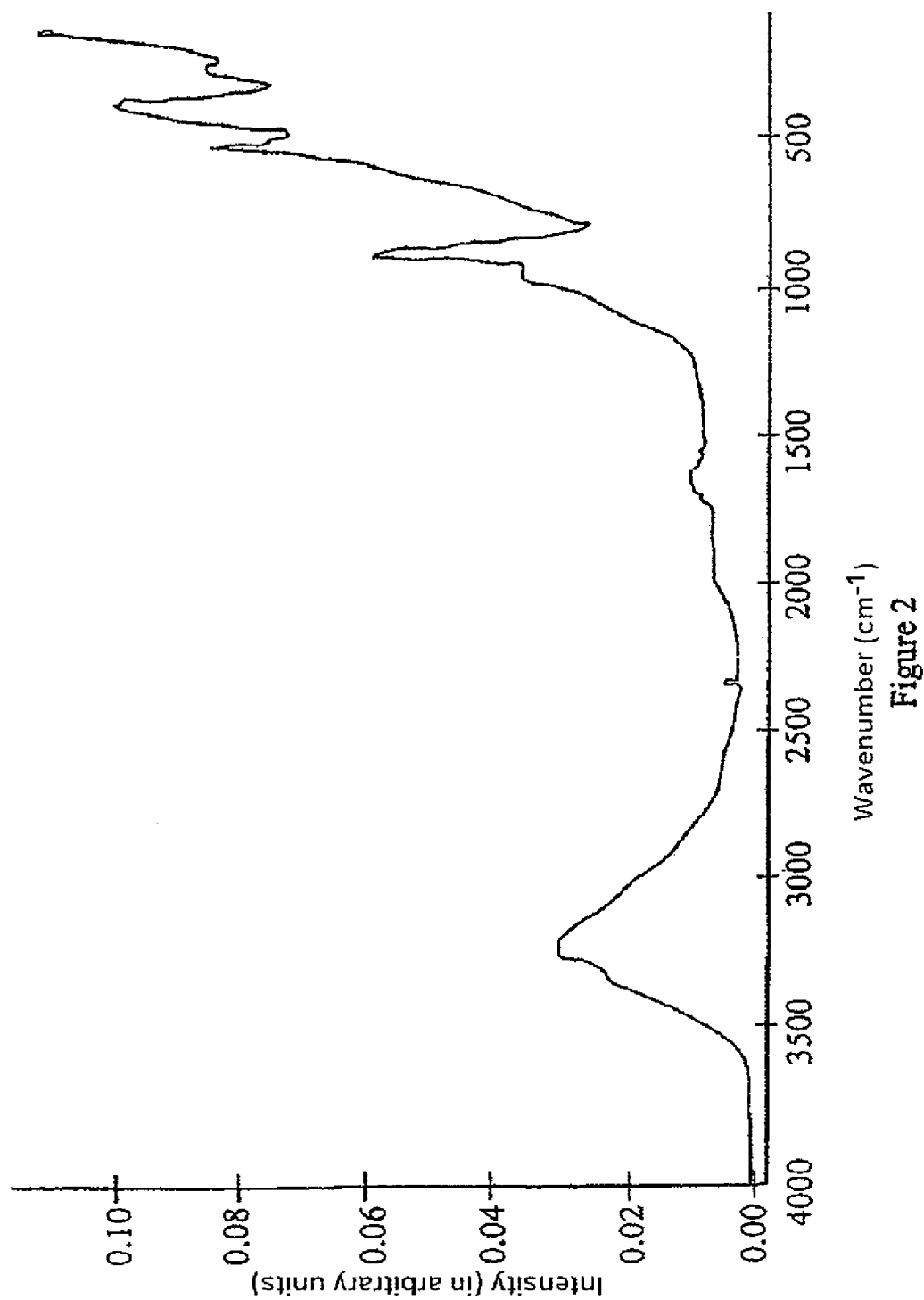
Figure 3:
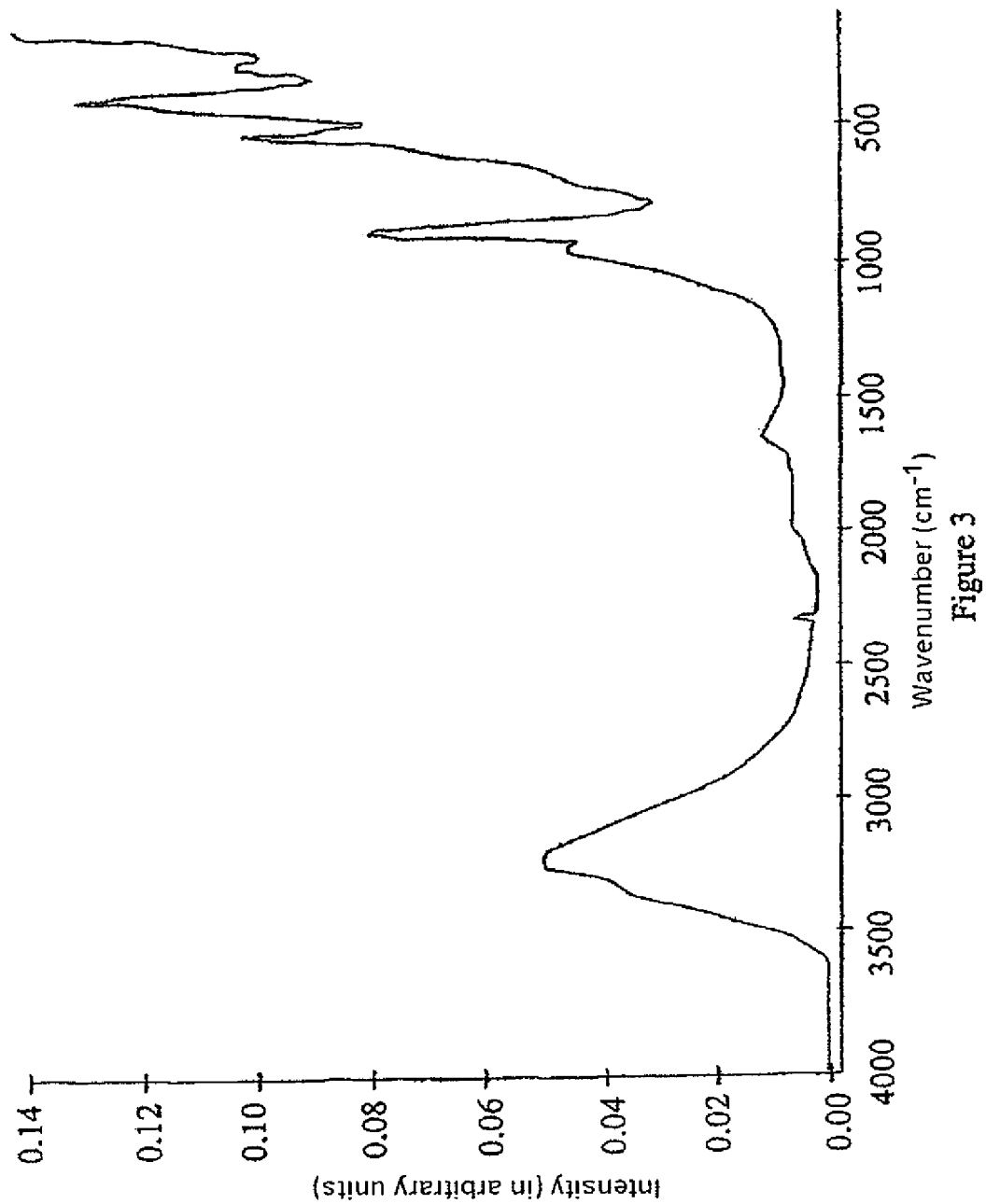

Thus, the invention relates to the use of these aluminosilicate polymers of the imogolite or allophane type as fire retardant. The invention also relates to a fire-retarded composition comprising these aluminosilicate polymers of the imogolite or allophane type. Finally, the invention also relates to a polymeric material comprising at least one aluminosilicate polymer of the imogolite or allophane type, preferably having a Raman spectrum as shown in FIGS. 1 to 3.

The effectiveness of using such aluminosilicate polymers of the imogolite or allophane type is demonstrated by the following tests.

The amount of $H_2O$ that a specific amount, i.e. 1 gram, of various materials of the AlOOH or $Al(OH)_3$ type can generate after heating at 300° C. for one hour was evaluated.

It is known that when $Al(OH)_3$ is heated at 250° C. it leads to $Al_2O_3$. By heating these products at 300° C., they must release the maximum amount of water. To do this, the specimens were predried for 48 hours under a pressure of $10^{-3}$ mm of mercury at 20° C. (room temperature) so as to remove the water that might be adsorbed on the surface of the particles. They were then stored under dry argon. One gram of each specimen was taken and oven-heated. The temperature rise was arbitrarily chosen to be 10°/minute. Reaching 300° C., the specimen was maintained at this temperature for one hour, then cooled down to room temperature (20° C.) under dry argon and then weighed on a Mettler balance of milligram precision.

By working with one gram of specimen it was possible to minimize the risks of weighing errors. The experiment was repeated three times for each specimen.

The powders treated after being weighed in argon were left in air for one hour and then reweighed so as to determine any water uptake.

Table 1 below shows the results obtained:

TABLE 1

| Specimen | % weight change (in argon) | % weight change (in air) |
| --- | --- | --- |
| Product 1 | 46 | — |
| Product 2 | 44 | — |
| Nano boehmite | 29 | — |
| Disperal ® P2 | 16 | — |
| Disperal ® | 16 | — |
| SH 500 | 25 | — |
| SH950 | 20 | — |

Product 1: filamentary (hollow structure) aluminosilicate polymer according to the invention (freeze-dried powder);
Product 2: particulate (hollow structure) aluminosilicate polymer according to the invention (freeze-dried powder);
Nanofilaments boehmite (according to J. F. Hochepied, P. Nortier, Powder technology 128, 268-275, (2002)): diameter 3-5 nm; length 100 nm;
Disperal P2 boehmite (sold by SASOL): 25 nm platelets;
Disperal boehmite (sold by SASOL): 80 nm platelets;
SH 500: dried alumina trihydrate $Al(OH)_3$ from Alcan, 93% of the particles smaller than 125 microns; and
SH950: dried alumina trihydrate $Al(OH)_3$, from Alcan, 80% of the particles smaller than 125 microns.

Table 1 shows that there is no weight change when the specimens are left in air for one hour after having been heat treated at 300° C. as described above. This demonstrates that everything that was mineralizable was indeed mineralized, that is to say the heat-treated specimen does not pick up water since there are no longer any hydroxyl groups on its surface.

Table 1 also shows that the aluminosilicate polymers of the imogolite or allophane type according to the invention lose on average 45% of their weight during the 300° C. heat treatment. This is due to the internal reservoir of water which collapses during the 300° C. heat treatment but also due to the water generated by the oxolation of the aluminol and silanol surfaces. The nanoscale size of these aluminosilicate polymers of the imogolite or allophane type makes it possible to optimize the oxidation mechanisms.

Specifically, for equivalent engaged mass, the aluminosilicate polymers of the imogolite or allophane type of the invention release twice the amount of water than the dried gibbsites (SH 500 and SH 950 specimens) and almost three times as much water as the nanoscale boehmites (Disperal® P2 and Disperal® specimens).

Also tested was the thermal behavior of films of PVC (polyvinyl chloride) polymer containing no fire retardant compared with that of PVC films containing 0.5 to 10 wt %, relative to the weight of the PVC polymer film, of a fire retardant according to the invention, which was an allophane corresponding to product 2 in table 1, or of Disperal®.

The following experimental protocol was implemented.

Fire-retardant/PVC suspensions in 2-butanone were prepared and coated onto microscope slides. Since these suspensions form films very easily, it was unnecessary to add a surfactant to the formulation. The films obtained were exposed to air and dried for at least 24 hours to remove any trace of 2-butanone. Likewise, polymer films containing only PVC were produced so as to be used as controls. The thickness of the films obtained after drying was 300 μm.

To ensure that the films were subjected to the same heat treatment, the following protocol was put into place. A steel wool filament was connected by means of crocodile clips to the terminals of a generator and, as soon as the circuit was closed, the heated filament of square cross section turned red (red hot: 500-800° C.) and then white (white hot: 1300-1500° C.) before breaking. The filament was held at 0.5 mm from the surface of the films to be evaluated and kept under mechanical tension (stretched) so as not to come into contact with the surface of the film upon breaking. For a constant voltage (4.5 V), the steel wool filament broke in 2 minutes.

The fire-retardant/PVC suspensions were prepared in the following manner:

5 ml of 2-butanone were added to 0.5 g of PVC lacquer; the mixture was stirred until complete dissolution; increasing amounts of fire retardant were added to this mixture so that said fire retardant represented 0.5%, 1%, 2%, 5% and 10% of the weight of PVC varnish respectively.

The results are given in Table 2 below, the control specimen having been repeated three times, the others twice, and the exposure time on each occasion being 2 minutes:

TABLE 2

| Specimen | Results |
| --- | --- |
| Control (pure PVC) | Black smoke with acrid whitish spirals; the film melts, thus propagating |
| 0.5 wt % allophane | Light brown at the hottest point, film integrity is maintained |
| 1 wt % allophane | Light yellow at the hottest point; film integrity is maintained |
| 2 wt % allophane | Trace of yellow at the hottest point; film integrity is maintained |
| 5 wt % allophane | Slight trace of yellow at the hottest point; film integrity is maintained |
| 10 wt % allophane | Slight trace of yellow at the hottest point; film integrity is maintained |
| 0.5 wt % Disperal ® | Black smoke; the film melts but there is no propagation front |
| 1 wt % Disperal ® | Black-brown; the film melts but there is no propagation front |
| 2 wt % Disperal ® | Brown; film integrity is maintained |
| 5 wt % Disperal ® | Light yellow at the hottest point; film integrity is maintained |
| 10 wt % Disperal ® | Slight trace of yellow at the hottest point; film integrity is maintained |

The results in table 2 show that the allophane, in an amount of 1 wt % relative to the weight of PVC, effectively protects the polymer (although slight yellowing is observed), whereas, to obtain a comparable effect using Disperal® from Sasol, it is necessary to use 5 wt % of Disperal® relative to the weight of PVC.

Thus, tables 1 and 2 show that the aluminosilicate polymers of the imogolite or allophane type which were synthesized according to the methods and processes described in French patent applications 2 817 488, 2 802 912 and 2 842 514 can be used as effective fire retardants, in particular for obtaining effective fire-retarded compositions that can be compounded into polymer-based materials having fire-retardant properties.

It will be clearly apparent to those skilled in the art that it is possible to use not only one or more aluminosilicate polymers of the allophane type but also one or more aluminosilicate polymers of the imogolite type, and also a blend of one or more aluminosilicate polymers of the allophane type with one or more aluminosilicate polymers of the imogolite type.

The invention claimed is:

1. A method of preparing a fire retardant article comprising molding an article comprising of at least one aluminosilicate polymer of imogolite or allophane, having a Raman spectrum as shown in one of FIGS. 1 to 3, as fire retardant.

* * * * *

UNITED STATES PATENT AND TRADEMARK OFFICE
CERTIFICATE OF CORRECTION

PATENT NO. : 8,287,779 B2
APPLICATION NO. : 12/918490
DATED : October 16, 2012
INVENTOR(S) : Poncelet It is certified that error appears in the above-identified patent and that said Letters Patent is hereby corrected as shown below:

Title page,
(73) Assignee: "Commissariat a l'Energie Atomique et aux Energies Alternative" should read
--Commissariat a l'Energie Atomique et aux Energies Alternatives--.

Signed and Sealed this
Fifth Day of March, 2013

Teresa Stanek Rea
*Acting Director of the United States Patent and Trademark Office*